United States Patent
Sitko et al.

(10) Patent No.: US 11,125,646 B2
(45) Date of Patent: Sep. 21, 2021

(54) SEALING DETECTION SYSTEM AND METHOD

(71) Applicant: Trelleborg Sealing Solutions Germany GmbH, Stuttgart (DE)

(72) Inventors: Mark C. Sitko, Fort Wayne, IN (US); Larry J. Castleman, Monroeville, IN (US)

(73) Assignee: Trelleborg Sealing Solutions Germany GmbH, Stuttgart (DE)

( * ) Notice: Subject to any disclaimer, the term of this patent is extended or adjusted under 35 U.S.C. 154(b) by 494 days.

(21) Appl. No.: 16/127,835

(22) Filed: Sep. 11, 2018

(65) Prior Publication Data

US 2019/0078972 A1 Mar. 14, 2019

Related U.S. Application Data

(60) Provisional application No. 62/556,526, filed on Sep. 11, 2017.

(51) Int. Cl.
*G01M 11/02* (2006.01)
*G01M 3/40* (2006.01)
(Continued)

(52) U.S. Cl.
CPC .......... *G01M 11/0257* (2013.01); *G01M 3/40* (2013.01); *B41M 5/24* (2013.01); *G06K 7/10544* (2013.01); *G06K 7/1417* (2013.01)

(58) Field of Classification Search
CPC .. G01M 11/0257; G01M 3/40; G01M 13/005; G06K 7/1417; G06K 7/10544; B41M 5/24; F16J 15/064
See application file for complete search history.

(56) References Cited

U.S. PATENT DOCUMENTS 5,121,929 A * 6/1992 Cobb ..................... F16J 15/064
277/317
5,678,827 A 10/1997 Burian et al.
(Continued)

FOREIGN PATENT DOCUMENTS

DE 10 2009 016 429 A1 10/2010

OTHER PUBLICATIONS

"Railcar Manway Gasket For General Applications", Parker Hannifin, taken from https://www.parker.com/literature/Seal%20Group/ISS%205814%20Manway%202014-05.pdf, May 30, 2017 (2 pages).
(Continued)

*Primary Examiner* — Nimeshkumar D Patel
*Assistant Examiner* — Tania Courson
(74) *Attorney, Agent, or Firm* — Hackler Daghighian Martino & Novak

(57) ABSTRACT

A seal detection device includes at least one seal with an outer surface where the outer surface is partially made up of a lateral surface and an axial surface. The at least one seal is provided with at least one seal mark and is placed on the lateral surface or the axial surface of the at least one seal. The at least one seal may be further provided with a unique code and may be associated with relevant seal data such as seal material, date of installation, last maintenance date, next scheduled maintenance/replacement, material safety data sheet(s), etc.

20 Claims, 2 Drawing Sheets

(51) Int. Cl.
*G06K 7/14* (2006.01)
*G06K 7/10* (2006.01)
*B41M 5/24* (2006.01)

(56) References Cited

U.S. PATENT DOCUMENTS

| | | | |
|---|---|---|---|
| 5,746,891 A | 5/1998 | Withers | |
| 6,532,132 B2 | 3/2003 | Tsujimoto et al. | |
| 6,666,379 B2 * | 12/2003 | Lake | G06K 19/06 235/491 |
| 6,776,340 B2 | 8/2004 | Murokh et al. | |
| 6,835,424 B2 | 12/2004 | Larson, Jr. et al. | |
| 6,845,983 B1 | 1/2005 | Suggs et al. | |
| 7,068,170 B2 * | 6/2006 | Green | G06K 19/04 235/492 |
| 7,158,034 B2 | 1/2007 | Corbett, Jr. et al. | |
| 7,372,366 B2 | 5/2008 | Lyon et al. | |
| 7,388,506 B2 * | 6/2008 | Abbott | B65D 41/045 340/572.1 |
| 7,405,818 B2 | 7/2008 | Heinzen | |
| 7,477,374 B2 | 1/2009 | Schmidt et al. | |
| 7,594,613 B2 | 9/2009 | Sato et al. | |
| 7,602,409 B2 | 10/2009 | Sato | |
| 7,665,355 B2 | 2/2010 | Zhang et al. | |
| 7,728,048 B2 | 6/2010 | LaBrec | |
| 7,927,685 B2 | 4/2011 | LaBrec et al. | |
| 7,969,308 B2 * | 6/2011 | Cotton | G06K 19/07798 340/572.1 |
| 8,060,264 B2 | 11/2011 | Oestermeyer et al. | |
| 8,083,152 B2 | 12/2011 | Theodossiou | |
| 8,091,791 B2 | 1/2012 | Brémond et al. | |
| 8,166,891 B2 | 5/2012 | Borowski et al. | |
| 8,225,721 B2 | 7/2012 | Hunter | |
| 8,282,013 B2 | 10/2012 | Stewart et al. | |
| 8,558,861 B2 | 10/2013 | Wanjek et al. | |
| 8,624,154 B2 | 1/2014 | McElroy et al. | |
| 8,642,161 B2 | 2/2014 | Kuntz et al. | |
| 8,651,801 B2 | 2/2014 | Shamseldin et al. | |
| 8,777,112 B2 * | 7/2014 | Mieslinger | F16J 15/064 235/492 |
| 8,893,973 B2 | 11/2014 | Shaffer et al. | |
| 8,893,975 B2 | 11/2014 | Sanford | |
| 9,168,696 B2 | 10/2015 | Farrell | |
| 9,200,204 B2 | 12/2015 | Marguerettaz et al. | |
| 9,224,196 B2 | 12/2015 | Duerksen et al. | |
| 9,343,434 B2 | 5/2016 | Chen | |
| 9,508,696 B2 | 11/2016 | Chen | |
| 9,517,855 B2 | 12/2016 | Murokh | |
| 9,528,885 B2 | 12/2016 | Gupta et al. | |
| 9,555,662 B2 | 1/2017 | Marcos et al. | |
| 9,662,833 B2 | 5/2017 | Farrell et al. | |
| 9,710,720 B2 * | 7/2017 | Mitti | G06K 9/3258 |
| 9,710,902 B2 | 7/2017 | Di Venuto Dayer et al. | |
| 10,663,093 B2 * | 5/2020 | Lennon | G01M 5/0083 |
| 2002/0150739 A1 | 10/2002 | Nagashima et al. | |
| 2005/0156487 A1 * | 7/2005 | Tseng | F16J 15/064 310/328 |
| 2008/0236819 A1 | 10/2008 | Foster et al. | |
| 2012/0112416 A1 | 5/2012 | Berg et al. | |
| 2014/0091093 A1 | 4/2014 | Rothweiler et al. | |
| 2014/0217074 A1 | 8/2014 | Thor | |
| 2015/0151483 A1 | 6/2015 | Ewing et al. | |
| 2015/0248570 A1 | 9/2015 | Johansen et al. | |
| 2015/0285054 A1 | 10/2015 | Johnson et al. | |
| 2015/0287152 A1 | 10/2015 | Oakes | |
| 2016/0098581 A1 | 4/2016 | Ascencio et al. | |
| 2016/0178057 A1 | 6/2016 | Sabotta et al. | |
| 2016/0193864 A1 | 7/2016 | Farrell et al. | |
| 2016/0214399 A1 | 7/2016 | Phillips et al. | |
| 2016/0321513 A1 | 11/2016 | Mitti et al. | |
| 2017/0014945 A1 | 1/2017 | Fraser et al. | |
| 2017/0043530 A1 | 2/2017 | Farrell et al. | |
| 2017/0081069 A1 | 3/2017 | Murokh | |
| 2017/0146975 A1 | 5/2017 | Clark | |

OTHER PUBLICATIONS

"Manway Gaskets for the Rail Industry, Reduce Labor Operating Costs by 90%", Parker Hannifin Corporation, 2014 (6 pages).
Notification of Transmittal of the International Search Report and the Written Opinion of the International Searching Authority, or the Declaration dated Nov. 19, 2018 for International Application No. PCT/US2018/050403 (12 pages).

* cited by examiner

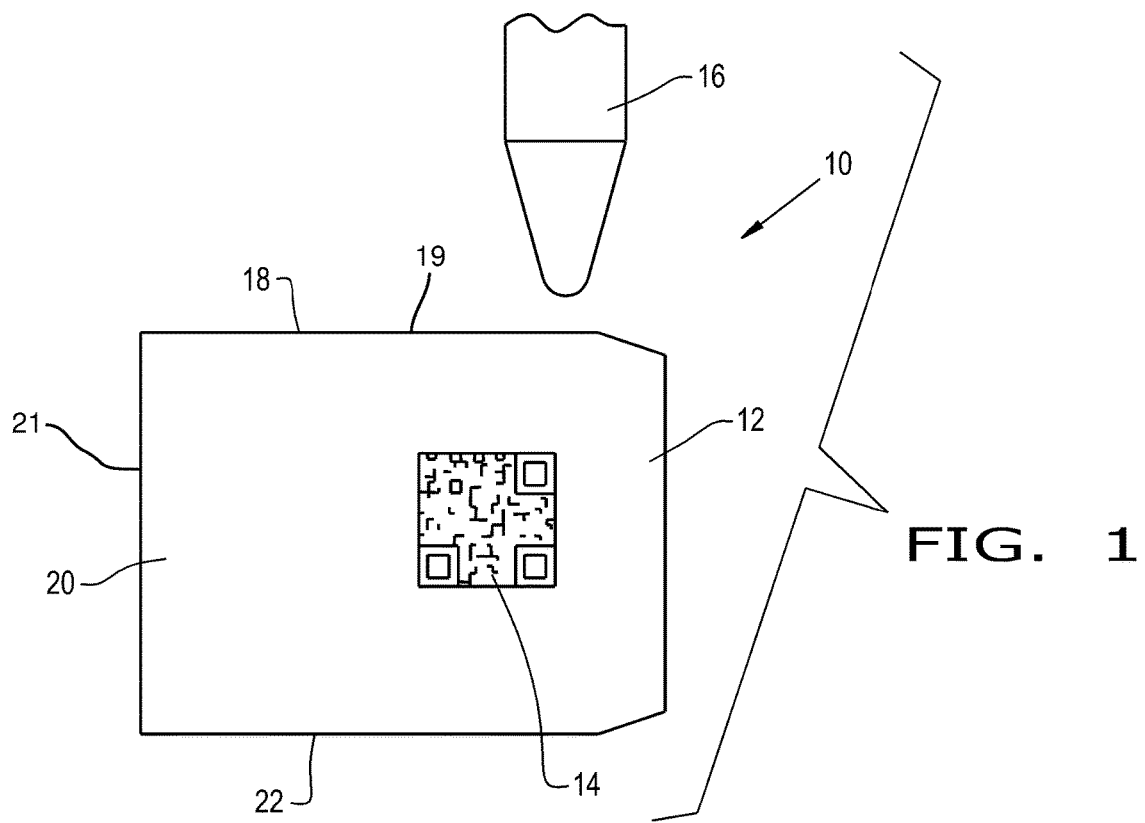
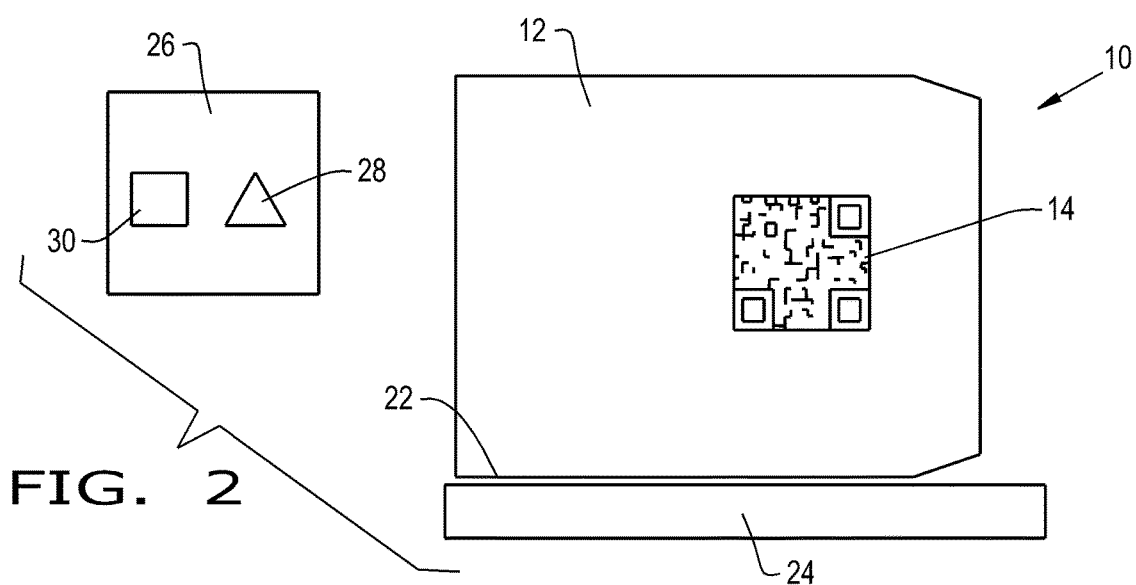

SEALING DETECTION SYSTEM AND METHOD

CROSS REFERENCE TO RELATED APPLICATIONS

This is a non-provisional application based upon U.S. provisional patent application Ser. No. 62/556,526 entitled "SEALING DETECTION", filed Sep. 11, 2017, which is incorporated herein by reference.

BACKGROUND OF THE INVENTION

1. Field of the Invention

The present invention relates to seal detection, in particular, to a system and method for determining relevant characteristics of a seal.

2. Description of the Related Art

Seal detection devices are used to determine when a seal should be repaired or replaced. Current seal detection devices lack the ability to provide an analysis of a sealing surface against a known reference or in the alternative against an earlier provide image of the current sealing surface.

U.S. Pat. No. 8,166,891 to Borowski et al. disclose concentric circular chevrons on a sealing surface to provide visual detection of proper installation. U.S. Pat. No. 7,477,374 to Schmidt et al. disclose a method and device for examining a sealing surface wherein an optical deflector is used to scatter light across a sealing surface. U.S. Pat. No. 7,405,818 to Heinzen discloses a self-monitoring static seal that utilizes an optical sensor and wear indicator on a sealing surface. U.S. Pat. No. 9,168,696 to Farrell and U.S. Pat. No. 9,662,833 to Farrell et al. disclose using lasers to change the optical properties of the seal surface.

U.S. Pat. No. 8,282,013 to Stewart et al. disclose a radio-frequency identification (RFID) chip that has been embedded into an o-ring or other fluid seal during manufacture of the o-ring or fluid seal. The embedded RFID chip may be used as a passive tag or onboard chip which may function as a radio receiver or transmitter as well as store electronic data. A disadvantage of Stewart et al. is the addition of an additional component, the RFID chip, to the o-ring or fluid seal and the requirement of embedding the RFID chip during the manufacturing phase.

What is needed in the art is an inexpensive solution to track seal surface condition and provide guidance on repair and/or replacement needs.

SUMMARY OF THE INVENTION

In one exemplary embodiment formed in accordance with the present invention, there is provided a seal detection device. The seal detection device includes at least one seal with an outer surface where the outer surface is partially made up of a lateral surface and an axial surface. The at least one seal is provided with at least one seal mark and is placed on the lateral surface or the axial surface of the at least one seal. The at least one seal may be further provided with a unique code and may be associated with relevant seal data such as seal material, date of installation, last maintenance date, next scheduled maintenance/replacement, material safety data sheet(s), etc.

In another exemplary embodiment formed in accordance with the present invention, there is provided a seal detection system. A sealing detection system includes at least one seal with at least one seal sealing surface and an outer surface including an edge region surface and an axially facing surface, at least one seal mark located on the outer surface of the at least one seal configured for a readable state in an installed or an uninstalled condition where the at least one seal mark is associated with an at least one relevant seal information characteristic of the at least one seal, at least one sealed element including a contact surface in communication with the at least one sealing surface of the at least one seal, the at least one seal mark associated with the at least one sealed element; and a device configured to store the at least one relevant seal information characteristic.

In another exemplary embodiment formed in accordance with the present invention, there is provided a method directed to tracking sealing performance between a seal and a sealed element. The method includes the steps of providing a seal configured for a sealed element, marking the seal with a seal mark, identifying the seal by a unique code, marking the sealed element with a sealed element mark, identifying the element by a unique code, performing a visual check of the seal's sealing surface to determine if the seal is acceptable, performing a visual check of the sealed surface to determine if the sealed surface is acceptable, and optionally identifying the torqueing of a connection between a sealed element and a seal to produce a torque curve data indicating compression of the seal.

One example of codes that can be placed on the seal and seal element are unique QR codes placed as a sticker or otherwise. Other possibilities are augmented reality concepts or a measuring plate which sandwiches the seal between the measuring plate and sealed surface, with information about the seal being detected by magnetics, acoustics, or electrical capacitance, resistance, or impedance.

To determine if the seal surface is acceptable for sealing, a reference seal surface image can be stored and associated with the marker of the seal. A user can then capture a current image of the seal surface which is compared to the reference seal surface image to determine differences between the reference seal surface image and current image of the seal surface. If the current image of the seal surface deviates from the reference image more than a predetermined threshold, the system can indicate that the seal needs to be replaced.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings, wherein:

FIG. 1 shows a seal detection device;

FIG. 2 shows a seal detection system;

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION OF THE INVENTION

Figure 3:
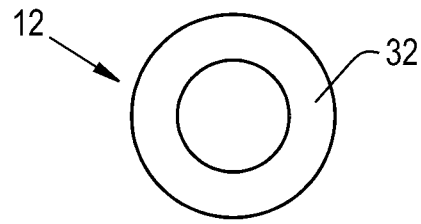
FIG. 3 shows a seal with an axially facing contact surface.

Referring now to the drawings, and more particularly to FIG. 1, there is shown a sealing detection device 10 which generally includes one or more seal(s) 12 and one or more mark(s) 14 located on the seal(s) 12. The sealing detection device 10 may be incorporated in numerous applications across various industries in which a seal 12 is used to seal a part. For example, the sealing detection device 10 may be used in a plate heat exchanger gasket, a manway seal on railway cars, gaskets on various valve and engine assemblies, seals in piping systems, annular seals, shaft seals, and other applications.

The seal 12 may be in the form of any desired seal, such as a gasket, that is placed in between two or more mating surfaces of a sealed element 24. The seal 12 may be composed of any desired material such as a rubber material, plastic material, or other materials used in seals.

The mark 14 may be in the form of any machine-readable optical label, such as a barcode, a QR code, a data matrix, etc. The mark 14 may be associated with information about the seal 12 such as the type of seal 12, the seal model number, the manufacturing date, date of installation of the seal 12, the material(s) of the seal 12, the previous and/or next service interval(s), a photograph or a service report of the previous inspection of the seal 12, the date of replacement of the seal 12, and any other desired information. Also, the mark 14 may be associated with the element 24 to be sealed or other hardware in which the seal 12 is to be installed. The mark 14 may be located on the seal 12 at any desired location. For example, the mark 14 may be located on an edge region 20, e.g. a laterally facing surface such as edge region surface 21 in FIG. 1, of the seal 12 which is not in contact with a sealing surface of the element 24 to be sealed (FIG. 2). Additionally, for example, the mark 14 may be placed on a contact surface 22 or as shown in FIG. 3 on an axially facing contact surface 32 (which can also be referred to as axially facing surface 32). The mark 14 may be also be positioned in a non-contact or non-sealing region 18 (which includes non-sealing surface 19 in FIG. 1) or a minimal contact region in order to minimize the effect of the mark 14 on sealing performance. The mark 14 may be incorporated on the seal 12 in such a way that the mark 14 is only readable by an optical device 26, for example a scanner, an optical sensor, a phone, etc., as shown in FIG. 2 when the seal is properly installed. The mark 14 may be unreadable if the seal 14 is not installed or not installed correctly, but the mark 14 may be readable when the seal 12 is deformed upon proper installation. In other words, the mark 14 may be readable when the seal 12 is under a desired amount of compression and/or torsion, which deforms, e.g. bulges, a region of the seal 12 where the mark 14 is located such that the size, shape, and/or depth of the mark 14 then becomes readable. For example, if the mark 14 is located on the side of the seal 12, upon installation and compression of the seal 12, the side of the seal 12 may bulge to expand the size of the mark 14. Thereby, the mark 14 may only be readable if the seal 12 is properly installed; this ensures proper assembly when the seal 12 is first installed or after the seal 12 has been inspected.

The mark 14 may be placed on and/or carved out of the seal 12. For example, the mark 14 can be placed on the seal 12 via a sticker or otherwise. Alternatively, the mark 14 may be etched in the surface of the seal 12 via photoablation by way of a light source 16, e.g. a laser 16. The laser 16 may carve out any desired size, shape, and/or depth of the mark 14, for example, the laser 16 may create a rectangular data matrix which has a depth of approximately 15-20 microns. The laser etching of the mark 14 may occur during a manufacturing or post-manufacturing process of the seal 12. The laser 16 may be in the form of any desired laser, such as any commercially available laser.

Figure 4:
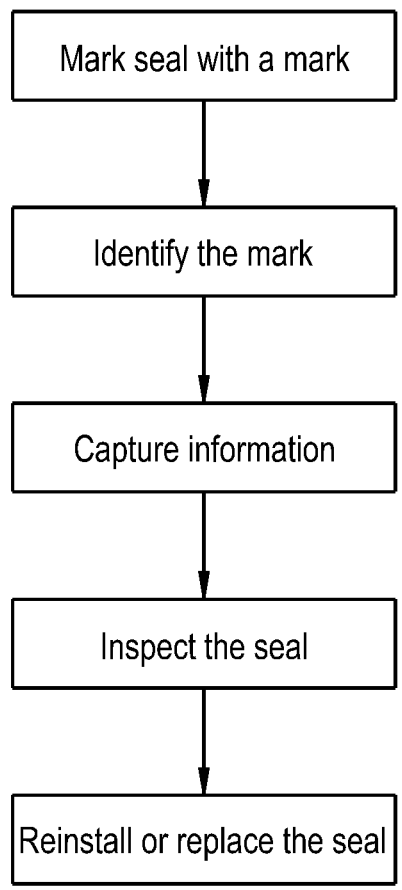
FIG. 4 shows a method of tracking sealing performance.

Referring now to FIG. 4, there is shown a method for monitoring the sealing between the seal 12 and a sealed element 24. The method generally includes the steps of marking the seal 12 with one or more mark(s) 14, identifying the mark(s) 14 on the seal 12, capturing information about the seal 12, inspecting the seal 12, inspecting the mating surface(s) and/or non-mating surface(s), and reinstalling or replacing the seal 12. The method may be performed by one or more individual(s). For example, an individual who is onsite may perform the method, or alternatively, the individuals who perform the method may include a combination of the onsite individual and an individual who is offsite, such as a remote inspector. It is also conceivable that an automated program may perform the method in isolation or in combination with an individual.

Initially, as discussed above, the seal 12 may be marked with a mark 14 such as a QR code. It is also conceivable to additionally mark the element 24 or hardware which is sealed by the seal 12. The method may also include a step of storing relevant data associated with the mark 14 that is located on the seal 12 and/or a mark that is located on the element 24 to be sealed.

The mark 14 and/or the element 24 to be sealed may be identified by scanning the mark 14 and/or the element 24 to be sealed. To identify the seal 12 and/or the sealed element 24, an individual or an automated computer scanner may scan the mark 14. In this regard, an individual may use a phone equipped with an image capturing device 28 to scan the mark 14. Upon scanning the mark 14, the individual may view previously stored data 30 associated with the seal 12 and/or the sealed element 24. As discussed above, the mark 14 may only be scannable or otherwise identifiable when the seal 12 is properly installed.

Capturing information and inspecting the seal 12 may include obtaining an image of the seal 12 and visually checking the seal 12 and/or the sealed element 24. A visual check of the surface of the seal 12 may be conducted to determine if the seal 12 is in an acceptable condition. For example, an individual may conduct a visual analysis, an individual may take a scan, a photograph, or write a report which is uploaded to a remote database and is subsequently checked by the offsite individual or offsite computer program, and/or an onsite computer program may conduct a visual analysis of the seal 12. The visual check may include an analysis of the seal 12 by visually spotting defects in the seal 12 and/or comparing the seal 12 to a previous visual check, such as a previous report or photograph of the seal 12. For instance, to determine whether the seal is acceptable for sealing, an individual may compare a current image of the seal surface to a reference seal surface image, e.g. a previous photograph of the seal 12 or a standard model of the seal, which is associated with the mark 14 and was previously stored in a database. If the current image of the seal surface deviates from the reference seal surface image more than a predetermined threshold, then the individual or computer program may indicate that the seal 12 needs to be repaired or replaced. A visual check of the seal 12 may also be conducted. For example, the visual check of the seal 12 may include visually checking the sealed element 24, visually checking the contact surface(s) of the sealed element 24, and/or visually checking the non-contact or non-sealing surface(s) to which the seal 12 is not attached.

It should be appreciated that inspecting the seal 12 may also include the collection and analysis of any relevant data. For example, the method may also include the collection and analysis of torqueing information between the seal 12 and the sealed element 24. The torqueing information may be automatically collected, e.g. by a torque clamp itself, and the torqueing information may be wirelessly transmitted to a remote database. The torqueing information may be used to produce a torque curve which is indicative of the compression of the seal 12.

Reinstalling or replacing the seal 12 may include the reinstallation of the same seal 12, the repair of the seal 12, or the replacement of the seal 12 such that a new seal 12 is installed.

Rescanning the mark 14 on the seal after installation may also be required since the mark 14 may only be identified upon proper installation, ensuring the seal 14 has been correctly (re)installed. Thereby, the method may be employed to keep a record of the initial installation, the current condition of the seal 12 and/or the sealed element 24, and whether the seal 12 was properly assembled after inspection.

By way of example only, monitoring of gaskets on plate heat exchangers may be provided. In this regard, an individual may scan a mark on a heat exchanger, which is uniquely keyed to a particular location, and/or a mark on the plate heat exchanger seal which seals the different channels of fluids. The individual may capture a picture of the plate heat exchanger gasket using his phone, and the individual may send the picture to an offsite individual who will conduct an analysis of the seal. Depending on whether the offsite individual or computer program determines that the seal is in a proper condition or nonproper condition, the onsite individual may reinstall or replace the plate heat exchanger gasket. After reassembly of the heat exchanger, the onsite individual may rescan the plate heat exchanger seal to ensure that the seal has been properly installed. Additionally, the torqueing information between the tie rods on the plate heat exchanger may be used to further determine whether the plate heat exchanger gasket has been properly assembled after inspection. Thereby, various issues associated with a missing seal, an insufficient torque during heat exchanger assembly, and an ineffective seal may be significantly reduced or entirely eliminated.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A sealing detection device, comprising:
   at least one seal including at least one sealing surface, at least one non-sealing surface, and an outer surface, the outer surface including an axially-facing surface, the seal being of a non-circular cross-section in an annular direction; and
   at least one seal mark located on the axially-facing surface of the outer surface of the at least one seal configured for a readable state in an installed or an uninstalled condition.

2. The sealing detection device of claim 1, wherein the outer surface includes an edge region surface.

3. The sealing detection device of claim 2, wherein the at least one seal mark is on the edge region surface.

4. The sealing detection device of claim 1, wherein the at least one seal is a gasket.

5. The sealing detection device of claim 1, wherein the at least one seal mark is a machine readable optical mark.

6. The sealing detection device of claim 1, wherein the at least one seal mark is associated with at least one relevant seal information characteristic.

7. The sealing detection device of claim 1, wherein the at least one seal mark is readable by an optical device.

8. The sealing detection device of claim 1, wherein the at least one seal mark is in the readable state when an installation force is applied to the at least one seal deforming a region of the at least one seal where the at least one mark is located indicating that the at least one seal is in a properly installed condition.

9. The sealing detection device of claim 1, wherein a laser is used for etching the at least one seal mark.

10. The sealing detection device of claim 9, wherein the at least one seal mark is a rectangular data matrix with a depth of 15-20μ.

11. A sealing detection system, comprising:
    at least one seal including at least one sealing surface, at least one non-sealing surface, and an outer surface, the outer surface including an axially-facing surface, the seal being of a non-circular cross-section in an annular direction; and
    at least one seal mark located on the axially-facing surface of the outer surface of the at least one seal configured for a readable state in an installed or an uninstalled condition, the at least one seal mark associated with at least one relevant seal information characteristic of the at least one seal;
    at least one sealed element including a contact surface in communication with the at least one sealing surface of the at least one seal, the at least one seal mark associated with the at least one sealed element; and
    a device configured to store the at least one relevant seal information characteristic.

12. A method for monitoring a sealing surface, comprising the steps of:
    providing at least one seal including at least one sealing surface, at least one non-sealing surface, and an outer surface, the outer surface including an axially-facing surface, the seal being of a non-circular cross-section in an annular direction; and at least one seal mark located on the axially-facing surface of the outer surface of the at least one seal configured for a readable state in an installed or an uninstalled condition;
    identifying the at least one seal mark;
    capturing at least one relevant seal information characteristic associated with the at least one seal mark;
    providing at least one sealed element including at least one sealed element sealing surface;
    inspecting the at least one seal sealing surface and the at least one sealed element sealing surface; and
    reinstalling or replacing the at least one seal.

13. The method of claim 12, wherein the method for monitoring the sealing surface is performed by an onsite individual, an offsite individual, an automated program, or a combination thereof.

14. The method of claim 12, further comprising the step of storing the relevant seal information characteristic associated with the at least one seal mark.

15. The method of claim 12, wherein the at least one sealed element is provided with at least one sealed element mark, wherein the method for monitoring the sealing surface being further provided with the step of identifying the at least one sealed element mark.

16. The method of claim 12, wherein the step of identifying the at least one seal mark is performed by an individual with an image capturing device or by an automated computer scanner.

17. The method of claim 12, wherein the steps of capturing information and inspecting the seal include capturing an image of the at least one seal, visually inspecting the at least one seal and at least one sealed element and determining if the at least one seal is in an acceptable condition.

18. The method of claim 12, wherein the step of reinstalling or replacing the at least one seal requires a comparison of the image of the at least one seal to a reference seal surface image, wherein the comparison is completed by an individual or an automated system using a predetermined threshold to determine if the at least one seal will be reinstalled or replaced.

19. The method of claim 12, wherein a torque clamp is provided between the at least one seal surface and the at least one seal element surface to collect and analyze a torque information.

20. The method of claim 12, wherein the at least one seal mark is in the readable state when an installation force is applied to the at least one seal deforming a region of the at least one seal where the at least one mark is located indicating that the at least one seal is in a properly installed condition, further including a final step to rescan the at least one seal mark to validate the properly installed condition.

\* \* \* \* \*